(12) United States Patent
Choi

(10) Patent No.: US 8,633,670 B2
(45) Date of Patent: Jan. 21, 2014

(54) RECONFIGURABLE ENERGY STORAGE SYSTEM

(75) Inventor: Looney Choi, Yongin-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 431 days.

(21) Appl. No.: 12/968,911

(22) Filed: Dec. 15, 2010

(65) Prior Publication Data

US 2011/0140649 A1 Jun. 16, 2011

(30) Foreign Application Priority Data

Dec. 15, 2009 (KR) ........................ 10-2009-0124630

(51) Int. Cl.
*H02J 7/00* (2006.01)
(52) U.S. Cl.
USPC ........................................... 320/101; 320/137
(58) Field of Classification Search
USPC .......................................................... 320/101
See application file for complete search history.

(56) References Cited

U.S. PATENT DOCUMENTS

| 5,926,004 | A | * | 7/1999 | Henze ............................. 320/109 |
| 6,208,039 | B1 | | 3/2001 | Mendelsohn et al. |
| 6,459,236 | B2 | * | 10/2002 | Kawashima .................. 320/118 |
| 2002/0105302 | A1 | * | 8/2002 | Parks et al. .................... 320/101 |
| 2005/0006958 | A1 | * | 1/2005 | Dubovsky ....................... 307/64 |
| 2006/0152224 | A1 | | 7/2006 | Kim et al. |

FOREIGN PATENT DOCUMENTS

| JP | 06-266458 A | 9/1994 |
| JP | 2000-156934 A | 6/2000 |
| JP | 2001-095163 A | 4/2001 |
| JP | 2003-348768 A | 12/2003 |
| JP | 2006-524332 A | 10/2006 |
| KR | 10 2005-0052718 A | 6/2005 |

OTHER PUBLICATIONS

Office Action issued in corresponding Korean application, 10-2009-0124630, dated Mar. 24, 2011.

* cited by examiner

*Primary Examiner* — Arun Williams
(74) *Attorney, Agent, or Firm* — Lee & Morse, P.C.

(57) ABSTRACT

An energy storage system for charging/discharging power of a plurality of battery packs connected between a grid and a variable power source, the energy storage system including an inverter connected between the grid, the plurality of battery packs, and the variable power source, the inverter inverting an AC power into a DC power and inverting a DC power into an AC power according to charge/discharge, a plurality of converters connected between the battery pack, the variable power source, and the grid, the converters being connected to the battery packs in a one-to-one relationship to convert a charge/discharge power of the battery packs, respectively, a plurality of battery switching devices, the battery switching devices being respectively connected between the converters and the battery packs, and a controller connected to the inverter and the converter to control driving, the controller controlling a turn-on/off operation of the battery switching devices.

11 Claims, 4 Drawing Sheets

US 8,633,670 B2

RECONFIGURABLE ENERGY STORAGE SYSTEM

BACKGROUND

1. Field

Embodiments relate to an energy storage system.

2. Description of the Related Art

A photovoltaic system may be used to convert a Direct Current (DC) power, which is produced by a solar cell, into an Alternating Current (AC) power. The photovoltaic system may provide the AC power to a grid to supply power to a load. When the production power of a solar cell is less than the consumption power of a load, all the power of the solar cell may be consumed in the load, and the grid may have insufficient power. When the production power of the solar cell is greater than the consumption power of the load, surplus power may be supplied to the grid.

SUMMARY

An example embodiment is directed to an energy storage system for charging/discharging power of a plurality of battery packs connected between a grid and a variable power source, the energy storage system including an inverter connected between the grid, the plurality of battery packs, and the variable power source, the inverter inverting an AC power into a DC power and inverting a DC power into an AC power according to charge/discharge, a plurality of converters connected between the battery pack, the variable power source, and the grid, the converters being connected to the battery packs in a one-to-one relationship to convert a charge/discharge power of the battery packs, respectively, a plurality of battery switching devices, the battery switching devices being respectively connected between the converters and the battery packs, and a controller connected to the inverter and the converter to control driving, the controller controlling a turn-on/off operation of the battery switching devices.

Each battery switching device may be connected in series between a corresponding converter and a corresponding battery pack.

The controller may independently control the respective battery switching devices.

The battery switching devices may open and close paths through which the battery packs are connected to the variable power source and the grid.

The battery switching devices may each include a relay switch.

The energy storage system may further include a plurality of converter switching devices, the converter switching devices being configured to connect corresponding ends of the battery switching devices to one another.

The converter switching devices may connect nodes that are disposed between the battery packs and the battery switching devices, or connect nodes that are disposed between the converters and the battery switching devices.

The converter switching devices may be configured to provide a delta 'Δ' type cyclic connection.

The controller may control an opening and closing operation of the converter switching devices.

The controller may independently control the respective converter switching devices.

The converter switching devices may each include a relay switch.

The variable power source may include a solar cell.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
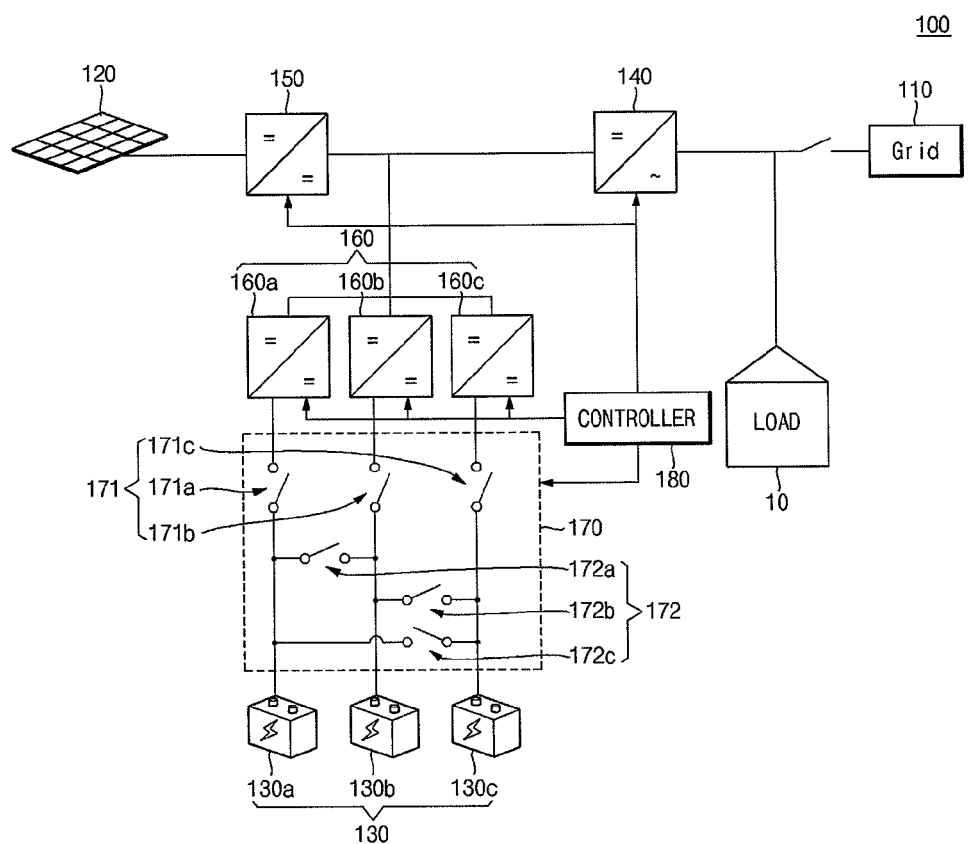
FIG. 1 illustrates a schematic diagram of an energy storage system according to an embodiment.

Korean Patent Application No. 10-2009-0124630, filed on Dec. 15, 2009, in the Korean Intellectual Property Office, and entitled: "Energy Storage System," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic diagram of an energy storage system according to an embodiment.

An energy storage system 100 may enable storage of power from a power source, e.g., a variable power source such as one driven by solar energy, hydro power, wind energy, etc. Referring to FIG. 1, the energy storage system 100 according to an embodiment may include a variable power source such as a solar cell 120, an inverter 140, a one-way converter 150, a bi-directional converter 160, and a switching device 170. The energy storage system 100 may be connected to a grid 110 and a battery pack 130.

The grid 110 may be a power line that receives power from a power company. The grid 110 may produce power in an AC voltage type, and transform and distribute the power to supply power to a load 10 such as a customer site. The load 10 may be connected between the grid 110 and the inverter 140, and may receive power from the grid 110 or the inverter 140.

The grid 110 supply may be supplemented by power that is supplied from the solar cell 120 and the battery pack 130, e.g., in the case that the grid 110 supply is insufficient for the power consumption of the load 10. In an implementation, the battery pack 130 may be charged with the power of the grid 110 at night.

The solar cell 120 produces power with sunlight. Accordingly, the solar cell 120 may produce power in the daytime. The solar cell 120 may supply power, which is produced in the daytime, to the load 10. Moreover, the solar cell 120 may supply power, e.g., power that is not consumed by the load, to the battery pack 130, thereby enabling the battery pack 130 to be charged. Moreover, the solar cell 120 may supply surplus power to the grid 110.

The battery pack 130 may be connected between the grid 110 and the solar cell 120. The battery pack 130 may receive power from one of the grid 110 and the solar cell 120 to perform charge. When the load 10 requires additional power, for example, when power from the grid 110 is broken or when the amount of power consumption of the load 10 is higher than the amount of power that is supplied from the grid 110 and the solar cell 120, the battery pack 130 may be discharged and thereby supply power to the load 10.

In an implementation, the battery pack 130 may include a plurality of battery packs 130a to 130c. In FIG. 1, for convenience, three battery packs, i.e., first to third battery packs 130a to 130c are illustrated. However, the number of the battery packs is not limited thereto. The first to third battery packs 130a to 130c configuring the battery pack 130 may be connected in parallel. Accordingly, the output voltage of the battery pack 130 may be the same as the output voltages of the first to third battery packs 130a to 130c.

A connection path between the battery pack 130 and the bi-directional converter 160 may be opened and closed by the switching device 170. For example, when a change of a portion of the battery pack 130, i.e., a change of the first battery pack 130a, is required, the first battery pack 130a may be changed while the second and third battery packs 130b and 130c are being normally driven. Moreover, even when the load 10 requires much power or the amount of power that is produced from the solar cell 120 is small, only a portion of the battery packs 130a to 130c may be flexibly driven, thereby increasing efficiency.

The inverter 140 may be connected between the grid 110, the solar cell 120, and the battery pack 130. The inverter 140 may be connected to a controller 180, and may perform an inversion operation according to a driving signal of the controller 180. The inverter 140 may perform inversion in two ways; the inverter 140 may invert the AC voltage of the grid 110 into a DC voltage, or may invert a DC voltage applied to the inverter 140 into an AC voltage that may be used in the grid 110 or the load 10.

The one-way converter 150 may be connected between the solar cell 120, the grid 110, and the battery pack 130. The one-way converter 150 may be connected to the controller 180, and may perform a conversion operation according to the driving signal of the controller 180. The one-way converter 150 may convert a DC voltage, which is generated from the solar cell 120, to a level appropriate for the inverter 140 or the battery pack 130.

The power generation of the solar cell 120 may be changed according to solar radiation and/or a voltage of a battery cell. Accordingly, the one-way converter 150 may be a maximum power point tacking converter that changes an output voltage in order for the maximum power to be generated according to solar radiation.

The bi-directional converter 160 may be connected between the battery pack 130, the grid 110, and the solar cell 120. The bi-directional converter 160 may convert a DC voltage from the battery pack 130 to a level appropriate for the inverter 140, and may convert a DC voltage from the inverter 140 to a level appropriate for the battery pack 130. The bi-directional converter 160 may include a plurality of converters so as to be in correspondence with the number of the battery packs 130. For example, the bi-directional converter 160 may include first to third converters 160a to 160c that respectively correspond to the first to third battery packs 130a to 130c of the battery pack 130. The first to third converters 160a to 160c may correspond to the first to third battery packs 130a to 130c in one-to-one relationship and be thereby configured with a single package. In this case, the cost of production of the bi-directional converter 160 and battery pack 130 may decrease.

A capacitive device (not shown) may be included between the one-way converter 150, the bi-directional converter 160, and the inverter 140, and it may allow a DC voltage, which is applied from the one-way converter 150 and/or the bi-directional converter 160, to be constantly supplied to the inverter 140.

The connection path between the bi-directional converter 160 and the battery pack 130 may be opened and closed by the switching device 170. Among the first to third converters 160a to 160c configuring the bi-directional converter 160, a converter (of 160a to 160c) connected to the battery pack 130 may be selectively driven. Accordingly, when the change of a portion of the bi-directional converter 160, for example, the change of the first converter 160a, is required because of fault, only the second and third converters 160b and 160c may be driven, and thus the bi-directional converter 160 may easily be changed while being normally driven.

The switching device 170 may be connected between the battery pack 130 and the bi-directional converter 160. The switching device 170 may be electrically connected to the controller 180. The switching device 170 may open and close the connection path between the battery pack 130 and the bi-directional converter 160 to control the driving of the battery pack 130 and bi-directional converter 160. The switching device 170 may be configured with a relay device, and in this case, a relay coil may be connected to the controller 180 and a relay switch may configure the switching device 170.

The switching device 170 may include a battery switching device 171 that is connected in series between the battery pack 130 and the bi-directional converter 160. The switching device 170 may include a converter switching device 172 that is connected to the battery switching device 171.

The battery switching device 171 may include first to third battery switching devices 171a to 171c, corresponding to the number of the battery pack 130. The first battery switching device 171a may be connected in series between the first battery pack 130a and the first converter 160a. Simultaneously, the second battery switching device 171b may be connected in series between the second battery pack 130b and the second converter 160b, and the third switching device 171c may be connected in series between the third battery pack 130c and the third converter 160c.

The battery switching device 171 may be opened and closed according to the control signal of the controller 180, and consequently, it may control the driving of the battery pack 130 and converter 160. For example, when the first battery switching device 171a is closed, the first battery pack 130a and the first converter 160a that are connected to the first battery switching device 171a may be driven. On the other hand, when the first battery switching device 171a is opened, the first battery pack 130a and the first converter 160a may not be driven because an electrical connection path is opened. Accordingly, the battery switching device 171 may drive the battery pack 130 or the converter 160, respectively.

The converter switching device 172 may be connected between the battery switching devices 171a to 171c. The converter switching device 172 may include first to third converter switching devices 172a to 172c corresponding to the number of the battery switching devices 171a to 171c, and may connect the battery switching devices 171a to 171c to one another.

The first to third converter switching devices 172a to 172c may be provided to connect nodes that are disposed between the battery pack 130 and the battery switching device 171. In another implementation, the first to third converter switching devices 172a to 172c may be provided to connect nodes that are disposed between the converter 160 and the battery switching device 171 (not shown).

The converter switching device 172 may connect the battery switching device 171 in a delta 'Δ' type corresponding to cyclic connection scheme. For example, the first converter switching device 172a may be connected between the first battery switching device 171a and the second battery switching device 171b, the second converter switching device 172b may be connected between the second battery switching device 171b and the third battery switching device 171c, and the third converter switching device 172c may be connected between the third battery switching device 171c and the first battery switching device 171a.

The converter switching device 172 may be connected to the controller 180, and may be opened and closed according to a control signal of the controller 180, thereby controlling the driving of the bi-directional converter 160. For example, in a normal state, the converter switching device 172 may be opened, and thus, the battery pack 130 and the bi-directional converter 160 connected to it may be driven, respectively. On the other hand, when the change of a portion of the bi-directional converter 160, for example, the change of the first converter 160a, is required because of fault, the first converter switching device 172a may perform a close operation in a state where the first battery switching device 171a is opened. In this case, the first converter 160a is not driven, but the second converter 160b and the third converter 160c may normally be driven. Accordingly, the first converter 160a may easily be changed.

The controller 180 may be connected to the inverter 140, the one-way converter 150, the bi-directional converter 160, and the switching device 170. The controller 180 may control the operation of the inverter 140, converter 150, bi-directional converter 160, and switching device 170 according to the power flow of the energy storage system 100.

In an implementation, the controller 180 may apply a control signal to the battery switching device 171 and the converter switching device 172 that configure the switching device 170. The controller 180 may control the battery switching device 171 and the converter switching device 172 to separately be opened and closed. Therefore, since only a portion of the battery pack 130 or converter 160 may be driven, change can easily be performed. Also, when the power amount of the load 10 is small or the amount of power that is produced by the solar cell 120 is small, only a portion of the battery pack 130 may be driven, thereby increasing efficiency.

Hereinafter, a method for driving an energy storage system according to an embodiment will be described in detail.

Figure 2:
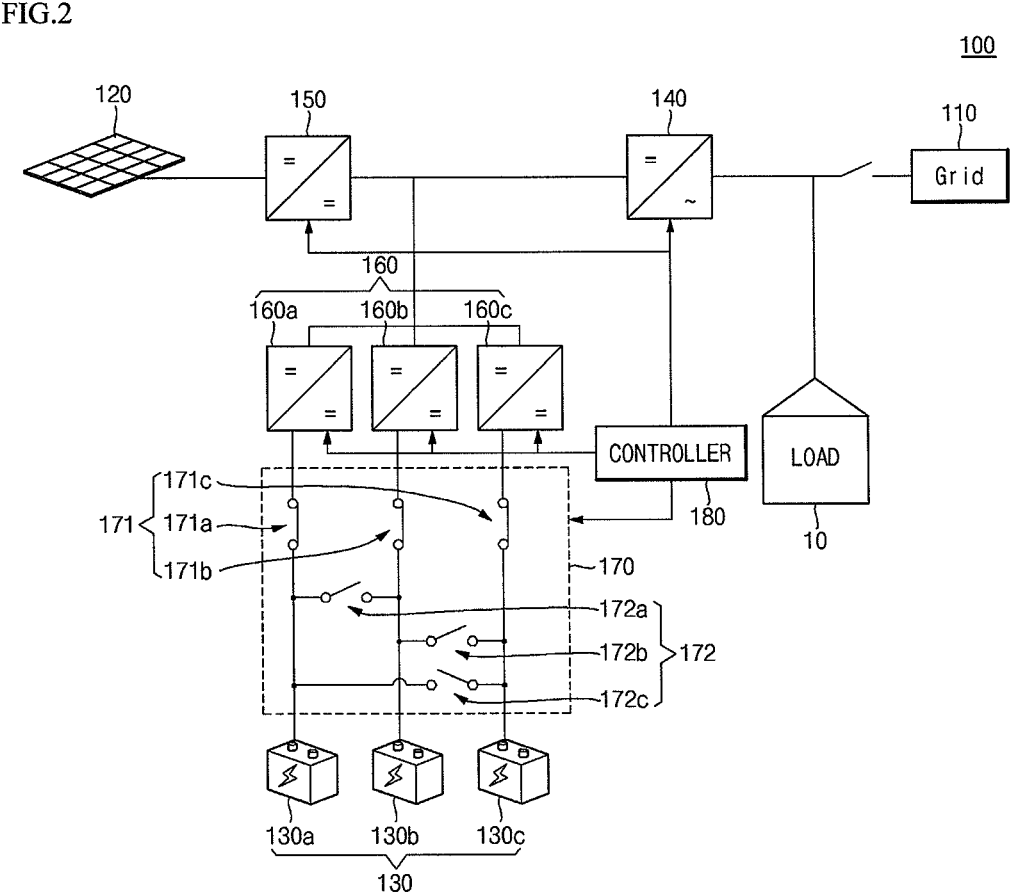
FIG. 2 illustrates a normal operation in an energy storage system according to an embodiment.

FIG. 2 illustrates a normal operation in an energy storage system according to an embodiment.

Referring to FIG. 2, according to an embodiment, the energy storage system 100 may be driven when all the battery switching devices 171a to 171c of the switching device 170 are closed and all the converter switching devices 172a to 172c of the switching device 170 are opened. As a result, the first to third battery packs 130a to 130c may be connected to the first to third converters 160a to 160c in one-to-one relationship. Accordingly, the battery pack 130 and the converter 160 overall may be driven.

Figure 3:
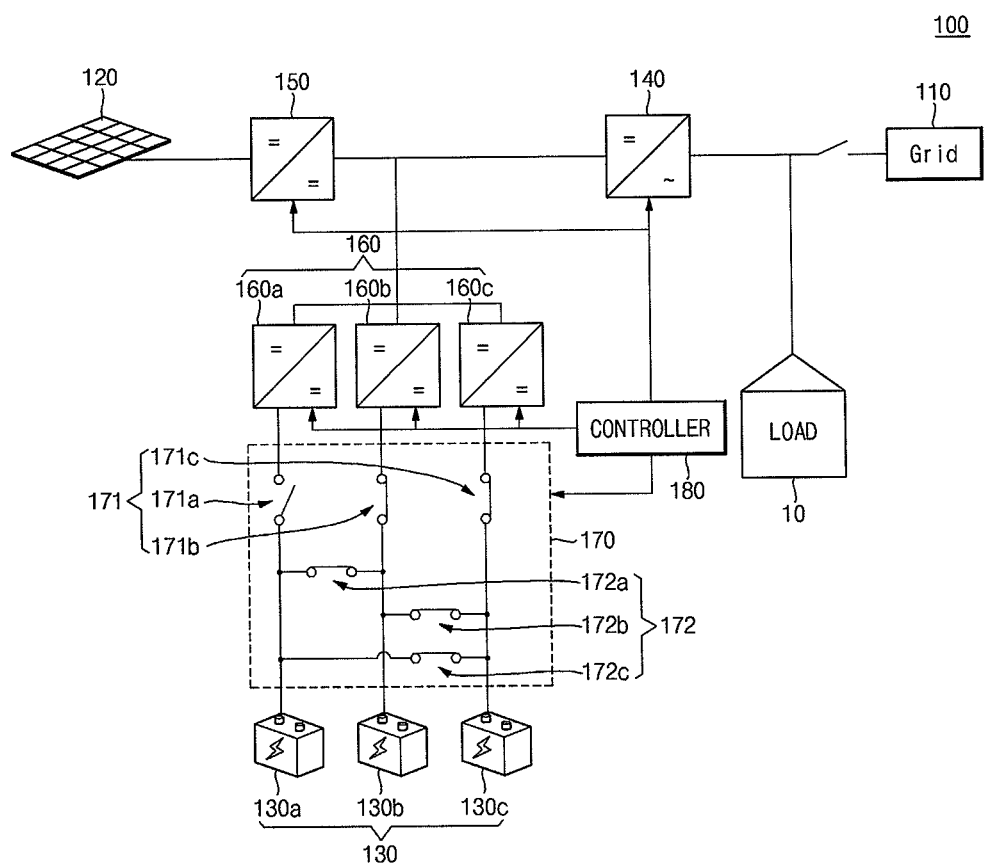
FIG. 3 illustrates an operation when an energy storage system according to an embodiment does not use one of converters.

FIG. 3 illustrates an operation when an energy storage system according to an embodiment does not use one of converters.

FIG. 3 illustrates a case in which the change of the first converter 160a is performed, e.g., because of fault. In this case, the first battery switching device 170a of the battery switching device 170 is opened, and the second and third battery switching devices 170b and 170c maintain a closed state. In an implementation, all the converter switching devices 172a to 172c may maintain a closed state. As a result, the first converter 160a may not be driven, while the second and third converters 160b and 160c may be normally driven. The first to third battery packs 130a to 130c configuring the battery pack 130 may be normally driven, and the current of the battery pack 130 may be input/output through the second and third converters 160b and 160c. Accordingly, since only the first converter 160a (which may be faulty) is isolated, the first converter may can easily be changed even without stopping the energy storage system 100 according to an embodiment.

Figure 4:
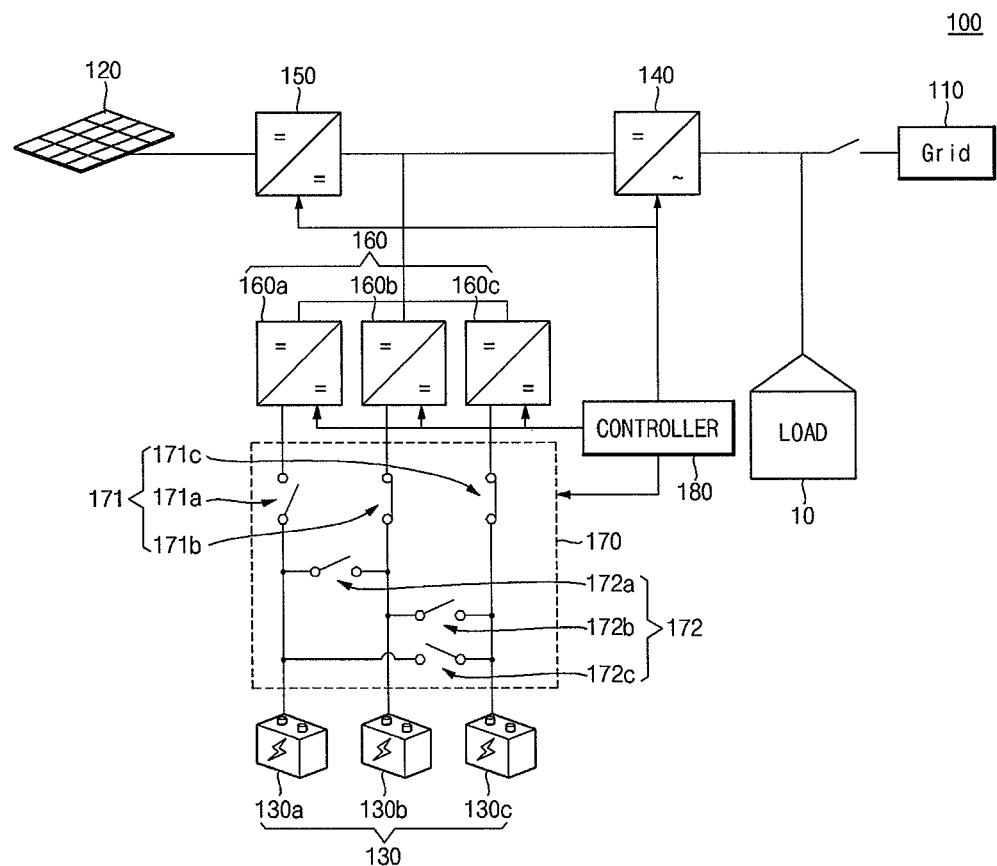
FIG. 4 illustrates an operation when an energy storage system according to an embodiment does not use one of batteries.

FIG. 4 illustrates an operation when an energy storage system according to an embodiment does not use one of batteries.

FIG. 4 illustrates a case in which the change of the first battery pack 130a is performed, e.g., because of fault, or because the driving of the first battery pack 130a is not required because the power amount of the load 10 is small or the amount of power that is produced by the solar cell 120 is small. In this case, the first battery switching device 171a of the battery switching device 171 is opened, and the second and third battery switching devices 171b and 171c are closed. In an implementation, all the converter switching devices 172a to 172c may be opened. As a result, the first battery pack 130a and the first converter 160a may not be driven, while the second and third battery packs 130b and 130c and the second and third converters 160b and 160c may be normally driven. Accordingly, the first battery pack 130a may be easily be changed, power may be efficiently be transferred to the load 10, or power may be efficiently applied from the solar cell 120.

As described above, according to an embodiment, the energy storage system 100 may open and close a current path through the switching device 170 that is included between the battery pack 130 and the bi-directional converter 160, thereby enabling only a portion of the battery pack 130 or bi-directional converter 160 to be driven. Accordingly, a portion of the battery pack 130 may be easily be idled or changed, and the battery pack 130 may be flexibly driven according to the load 10 or the amount of power that is produced by the solar cell 120.

A power storage system may be used to store surplus power generated in a grid, e.g., at night, in an energy storage device. The stored power may be supplied at peak times, e.g., during the daytime. The power storage system may thus smooth out power consumption, i.e., reduce consumption peaks and increase consumption valleys. The power storage system may use a storage battery as an energy storage device, and such a power storage system may be small enough to be used inside customer sites to thereby supply power when power failure in the grid occurs.

An energy storage system may combine a photovoltaic system and a power storage system. The energy storage system may store surplus power of a solar cell and grid, and then supply the stored power to a load. Even when power failure occurs, the energy storage system may supply a stable power to the load.

As described above, an embodiment may provide an energy storage system in which a converter or a battery pack may be easily changed, and/or a battery pack may be efficiently used.

An energy storage system according to an example embodiment may open and close a current path through a switching device that is included between a battery pack and a bi-directional converter, thereby enabling only a portion of the battery pack or bi-directional converter to be driven. Thus, the energy storage system may provide for easy change a portion of the battery pack and flexibly drive the battery pack according to the production amount of a solar cell or requirement of a load.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims

What is claimed is:

1. An energy storage system for charging/discharging power of a plurality of battery packs connected between a grid and a variable power source, the energy storage system comprising:
    an inverter connected between the grid, the plurality of battery packs, and the variable power source, the inverter inverting an AC power into a DC power and inverting a DC power into an AC power according to charge/discharge;
    a plurality of converters connected between the battery pack, the variable power source, and the grid, the converters being connected to the battery packs in a one-to-one relationship to convert a charge/discharge power of the battery packs, respectively;
    a plurality of battery switching devices, the battery switching devices being respectively connected between the converters and the battery packs;
    a plurality of converter switching devices, the converter switching devices being configured to individually connect corresponding ends of the battery switching devices to one another; and
    a controller connected to the inverter and the converter to control driving, the controller controlling a turn-on/off operation of the battery switching.

2. The energy storage system as claimed in claim 1, wherein each battery switching device is connected in series between a corresponding converter and a corresponding battery pack.

3. The energy storage system as claimed in claim 1, wherein the controller independently controls the respective battery switching devices.

4. The energy storage system as claimed in claim 1, wherein the battery switching devices open and close paths through which the battery packs are connected to the variable power source and the grid.

5. The energy storage system as claimed in claim 1, wherein the battery switching devices each include a relay switch.

6. The energy storage system as claimed in claim 1, wherein the converter switching devices connect nodes that are disposed between the battery packs and the battery switching devices, or connect nodes that are disposed between the converters and the battery switching devices.

7. The energy storage system as claimed in claim 1, wherein the converter switching devices are configured to provide a delta 'Δ' type cyclic connection.

8. The energy storage system as claimed in claim 1, wherein the controller controls an opening and closing operation of the converter switching devices.

9. The energy storage system as claimed in claim 1, wherein the controller independently controls the respective converter switching devices.

10. The energy storage system as claimed in claim 1, wherein the converter switching devices each include a relay switch.

11. The energy storage system as claimed in claim 1, wherein the variable power source includes a solar cell.

* * * * *